United States Patent
Yamada et al.

(10) Patent No.: US 8,358,042 B2
(45) Date of Patent: Jan. 22, 2013

(54) ELECTRIC MOTOR INTEGRATED HYDRAULIC MOTOR

(75) Inventors: Masahiro Yamada, Kobe (JP); Ryo Yamamoto, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 272 days.

(21) Appl. No.: 12/918,959

(22) PCT Filed: Nov. 20, 2008

(86) PCT No.: PCT/JP2008/003399
§ 371 (c)(1),
(2), (4) Date: Sep. 1, 2010

(87) PCT Pub. No.: WO2009/110043
PCT Pub. Date: Sep. 11, 2009

(65) Prior Publication Data
US 2011/0001370 A1    Jan. 6, 2011

(30) Foreign Application Priority Data
Mar. 3, 2008   (JP) .................................. 2008-052126

(51) Int. Cl.
*H02K 7/06*    (2006.01)
(52) U.S. Cl. ......................................... 310/82; 310/112
(58) Field of Classification Search ................... 310/112, 310/113, 114, 82
See application file for complete search history.

(56) References Cited

U.S. PATENT DOCUMENTS

| | | | |
|---|---|---|---|
| 4,729,717 A | | 3/1988 | Gupta |
| 5,220,225 A | | 6/1993 | Moon, Jr. |
| 5,708,311 A | * | 1/1998 | Claar et al. ...................... 310/90 |
| 5,877,577 A | | 3/1999 | Ishizaki et al. |
| 5,927,073 A | | 7/1999 | Ishizaki et al. |
| 6,565,329 B2 | * | 5/2003 | Yokomachi et al. .......... 417/269 |
| 7,014,428 B2 | * | 3/2006 | Pitla et al. .................. 417/222.2 |
| 7,182,583 B2 | * | 2/2007 | Gandrud et al. .............. 417/371 |
| 2001/0048251 A1 | * | 12/2001 | Ieoka .......................... 310/49 R |

(Continued)

FOREIGN PATENT DOCUMENTS

| JP | 7077155 A | 3/1995 |
|---|---|---|
| JP | 9088807 A | 3/1997 |

(Continued)

OTHER PUBLICATIONS

ISA Japan, International Search Report of PCT/JP2008/003399, Mar. 3, 2009, 2 pages.

*Primary Examiner* — Nguyen N Hanh
(74) *Attorney, Agent, or Firm* — Alleman Hall McCoy Russell & Tuttle LLP

(57) ABSTRACT

The present invention provides a small-size light-weight electric motor integrated hydraulic motor which is simple in configuration, integrally includes an electric motor and a hydraulic motor, and is capable of efficiently operating, by being configured such that: a swash plate type hydraulic motor and an electric motor driven by the swash plate type hydraulic motor are provided in one casing; the casing is filled with oil; a driving shaft of the swash plate type hydraulic motor is configured to extend from a front end portion of the casing up to a rear end portion thereof and be supported at the front and rear end portions of the casing; the swash plate type hydraulic motor and a rotor of the electric motor are provided in series at the driving shaft; and a stator of the electric motor is fixed to an inner side portion of the casing.

4 Claims, 6 Drawing Sheets

U.S. PATENT DOCUMENTS

| | | |
|---|---|---|
| 2003/0068239 A1 | 4/2003 | Suzuki |
| 2003/0098624 A1* | 5/2003 | Iwasa et al. .................. 310/112 |
| 2007/0053780 A1 | 3/2007 | Ruffner et al. |

FOREIGN PATENT DOCUMENTS

| | | |
|---|---|---|
| JP | 9256943 A | 9/1997 |
| JP | 11303724 A | 11/1999 |
| JP | 2000161195 A | 6/2000 |
| JP | 2005290882 A | 10/2005 |
| JP | 2007010006 A | 1/2007 |

* cited by examiner

ELECTRIC MOTOR INTEGRATED HYDRAULIC MOTOR

TECHNICAL FIELD

The present invention relates to an electric motor integrated hydraulic motor configured such that an electric motor and a hydraulic motor are integrally provided in one casing.

BACKGROUND ART

Generally, a combination of a hydraulic motor and a reduction gear is conventionally used as a swing actuator that is a swing mechanism of construction machinery. Moreover, the combination of the hydraulic motor and the reduction gear is also used as a swing mechanism of a crane or a winch of a ship.

When such a swing mechanism using the hydraulic motor slows down, it needs to release rotational energy accumulated in inertial bodies (such as a boom, an arm, and a bucket) during a swing operation. Therefore, a relief valve is provided in a hydraulic circuit, and the accumulated energy is converted into heat and the heat is released by pressure generated by the relief valve when the swing mechanism slows down. To be specific, in the case of the swing mechanism, since the energy accumulated in the inertial bodies during the swing operation is abandoned as the heat when the swing mechanism slows down, the energy use efficiency is low.

Similarly, in the case of the winch, since the relief valve provided in the hydraulic circuit converts the potential energy of a cargo into the heat and releases the heat when the winch rolls down, the energy use efficiency is low.

Here, in this kind of technology, proposed is an invention for improving the energy use efficiency. One example is an invention in which a surplus pressure fluid of a pump driven by a motor generator connected to an engine is accumulated in an accumulator, and the pressure fluid is effectively utilized according to need (see Document 1, for example).

Another example is an invention in which the hydraulic motor and the electric motor are used at the same time to drive a swing drive unit of a swing machinery, and when the swing drive unit steadily swings and slows down, the electric motor is caused to carry out electric power regeneration to accumulate regenerative electric power in a capacitor (see Document 2, for example).

Further, proposed is an electro-hydraulic hybrid motor configured such that a hydraulic pump is driven by the electric motor, and the hydraulic motor is driven by delivery fluid from the hydraulic pump (see Documents 3 and 4, for example).
Document 1: Japanese Laid-Open Patent Application Publication No. 2007-10006
Document 2: Japanese Laid-Open Patent Application Publication No. 2005-290882
Document 3: Japanese Laid-Open Patent Application Publication No. 8-251867
Document 4: Japanese Laid-Open Patent Application Publication No. 8-251868

DISCLOSURE OF THE INVENTION

Problems to be Solved by the Invention

However, in Document 1, in order to temporarily accumulate the pressure fluid, a complex hydraulic circuit is required. This increases the size of a device, so that it is difficult to mount such device on, for example, small construction machinery.

Moreover, in Document 2, a hydraulic unit including the hydraulic motor and an electric unit including the electric motor are separately provided, so that a large installation space is required and the weight increases. In addition, a special-structure reduction mechanism capable of causing both the hydraulic motor and the electric motor to carry out the electric power regeneration needs to be additionally provided.

Further, in Documents 3 and 4, the electric motor, the hydraulic pump, and the hydraulic motor are provided in a motor case. This significantly increases the complexity of the structure. In addition, since the hydraulic motor is driven by the delivery fluid from the hydraulic pump, the energy use efficiency is low.

Here, an object of the present invention is to provide a small-size light-weight electric motor integrated hydraulic motor which is simple in configuration, integrally includes an electric motor and a hydraulic motor, and is capable of operating efficiently.

Means for Solving the Problems

To achieve the above object, the present invention is an electric motor integrated hydraulic motor configured such that a swash plate type hydraulic motor and an electric motor are provided in one casing, wherein: the casing is filled with oil; and a driving shaft of the swash plate type hydraulic motor is configured to extend from a front end portion of the casing up to a rear end portion thereof and be supported at the front and rear end portions in the casing. With this, the swash plate type hydraulic motor and the electric motor which are supported by the driving shaft constituted by a continuous shaft and having a simple configuration can be provided in one casing, and the electric motor integrated hydraulic motor which is small in size and light in weight and has high energy use efficiency can be configured.

Moreover, the swash plate type hydraulic motor and a rotor of the electric motor may be provided in series at the driving shaft, and a stator of the electric motor may be fixed to an inner side portion of the casing. With this, the electric motor and the hydraulic motor are driven by the same driving shaft, so that a connection portion therebetween can be simplified.

Further, a rotor of the electric motor may be provided at an outer peripheral portion of the swash plate type hydraulic motor, and a stator of the electric motor may be provided at an inner side portion of the casing. With this, the electric motor rotates at the outer peripheral portion of the hydraulic motor, so that the electric motor integrated hydraulic motor can be reduced in entire length and weight.

Moreover, an electric motor shaft may be provided in parallel with the driving shaft, the swash plate type hydraulic motor may be provided at the driving shaft, the electric motor may be provided at the electric motor shaft, and a power transmission mechanism may be provided between the electric motor shaft and the driving shaft. With this, by the setting of the power transmission mechanism, the combination of the driving of the driving shaft by the electric motor and the driving of the driving shaft by the hydraulic motor can be optimally set. The electric motor and the hydraulic motor may be replaced with each other.

Further, in the configuration in which the swash plate type hydraulic motor and the electric motor are provided at the driving shaft, the configuration may include: a cooling passage penetrating the stator of the electric motor in an axial direction; and an oil discharge port through which operating fluid of the swash plate type hydraulic motor having flowed through the cooling passage is discharged to an outside of the casing. With this, after the operating fluid of the swash plate type hydraulic motor is utilized as cooling oil for the electric motor, the oil can be then discharged through the oil discharge port. As the operating fluid used for cooling, a part of drain oil or inlet/outlet oil of the swash plate type hydraulic motor can be utilized.

Moreover, in the configuration in which the rotor of the electric motor is fixed to the outer peripheral portion of the swash plate type hydraulic motor, the configuration may include: a cooling passage penetrating the stator of the electric motor in an axial direction; an oil passage formed between the swash plate type hydraulic motor and the rotor of the electric motor and extending in the axial direction of the driving shaft; a circulating mechanism configured to rotate integrally with the rotor of the electric motor; and an oil discharge port through which operating fluid having been circulated in the casing by the circulating mechanism is discharged to an outside of the casing. With this, the flow of the oil can be generated in the oil passage in the circulating mechanism by the rotation of the rotor, and the operating fluid from the swash plate type hydraulic motor can be efficiently utilized as cooling oil for the electric motor and can be then discharged.

Further, in the configuration in which the rotor of the electric motor is fixed to the outer peripheral portion of the swash plate type hydraulic motor, the configuration may include: an oil supply port and an oil discharge port which are formed on the casing and respectively located on a front side and rear side of the electric motor in an axial direction; and a forced circulation mechanism configured to forcibly supply oil through the oil supply port, cause the oil to flow between the rotor and the stator of the electric motor, and discharge the oil through the oil discharge port. With this, the portion between the stator and the rotor of the electric motor can be cooled down by the oil having been forcibly supplied through the oil supply port into the casing by the forced circulation mechanism, and the oil can be then discharged through the oil discharge port. Therefore, the electric motor can be cooled down more stably. In addition, the retention of foreign matters between the stator and the rotor of the electric motor can be prevented. Moreover, as the operating fluid used for forcible supply, a part of the sucked oil of the swash plate type hydraulic motor may be used.

Effects of the Invention

The present invention can provide an electric motor integrated hydraulic motor which is simple in configuration, integrally includes an electric motor and a swash plate type hydraulic motor, is reduced in size and weight, and realizes an operation of high energy use efficiency.

Figure 1:
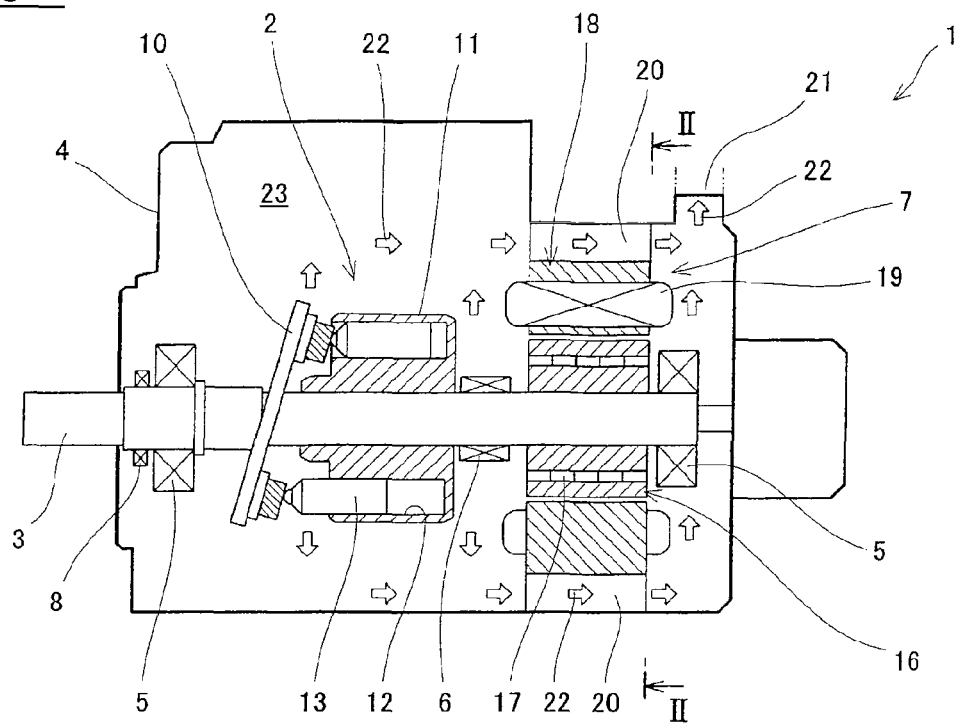
FIG. 1 is a longitudinal sectional view showing an electric motor integrated hydraulic motor according to Embodiment 1 of the present invention.

EXPLANATION OF REFERENCE NUMBERS 1 electric motor integrated hydraulic motor
2 swash plate type hydraulic motor
3 driving shaft
4 casing
7 electric motor
10 fixed swash plate
11 cylinder block
13 piston
16 rotor
18 stator
20 cooling passage
21 oil discharge port
22 operating fluid
23 oil
25 electric motor integrated hydraulic motor
26 electric motor integrated hydraulic motor
27 reduction mechanism
28 electric motor shaft
35 electric motor integrated hydraulic motor
36 oil passage
37 fin
41 electric motor integrated hydraulic motor
42 oil discharge port
43 oil supply port
44 forced circulation mechanism

BEST MODE FOR CARRYING OUT THE INVENTION

Figure 2:
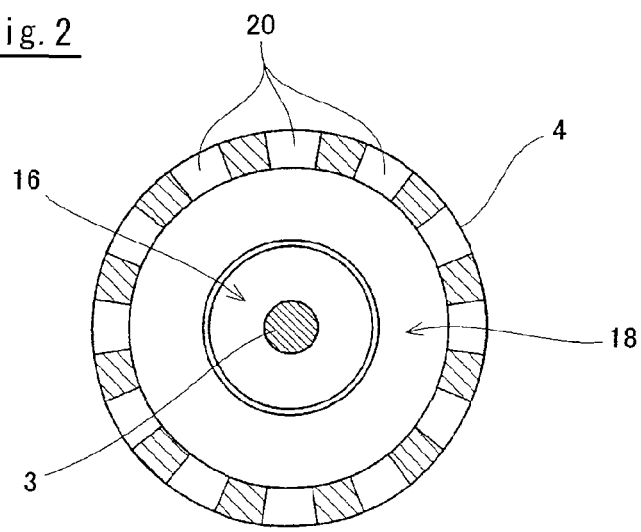
FIG. 2 is a cross sectional view taken along line II-II of FIG. 1.

Hereinafter, one embodiment of the present invention will be explained based on the drawings. FIG. 1 is a longitudinal sectional view showing an electric motor integrated hydraulic motor according to Embodiment 1 of the present invention. FIG. 2 is a cross sectional view taken along line II-II of FIG. 1. The following will explain, as one example, a swash plate type hydraulic motor 2 including a fixed swash plate 10.

As shown in FIG. 1, in an electric motor integrated hydraulic motor 1 according to the present embodiment, a driving shaft 3 of the swash plate type hydraulic motor 2 (hereinafter simply referred to as a "hydraulic motor") is constituted by a continuous shaft extending from a front end portion of a casing 4 up to a rear end portion thereof, and the driving shaft 3 is rotatably supported by bearings 5 respectively provided at the front and rear end portions in the casing 4 and a bearing 6 provided at a center portion in the casing 4. A seal member 8 sealing a periphery of the driving shaft 3 is provided on the outside of the bearing 5 in a front portion of the casing 4.

In the casing 4, the hydraulic motor 2 is provided at a front portion of the driving shaft 3, and an electric motor 7 is provided at a rear portion of the driving shaft 3. In the present embodiment, the hydraulic motor 2 and the electric motor 7 are provided at the driving shaft 3 in series.

The hydraulic motor 2 includes a fixed swash plate 10 and a cylinder block 11 which rotates integrally with the driving shaft 3. The fixed swash plate 10 is maintained at a predetermined inclination angle by a tilt mechanism (not shown) provided at the casing 4. The cylinder block 11 includes a plurality of cylinders 12 arranged in a circumferential direction of the driving shaft 3. In each of the cylinders 12, a piston 13 capable of reciprocating therein is provided. Each piston 13 has one end (left side in the drawing) contacting the fixed swash plate 10 and the other end (right side in the drawing) through which pressure oil is supplied and discharged. A mechanism configured to supply and discharge the pressure oil by which the swash plate type hydraulic motor 2 is driven is not shown.

In the hydraulic motor 2, the pressure oil is supplied and discharged from one side of each of the pistons 13 arranged in the circumferential direction of the driving shaft 3, the side being opposite the swash plate side. With this, a torque of causing the pistons 13 and the cylinder block 11 to rotate is generated between each piston 13 and the fixed swash plate 10 by a total force of the force of the pressure oil and its reaction force. Therefore, by causing the pistons 13 generating the torque to move in the circumferential direction, the cylinder block 11 and the driving shaft 3 are integrally rotated.

The electric motor 7 is a synchronous motor configured such that magnets 17 are arranged around a rotor 16, and an armature winding 19 is provided at a stator 18. The electric motor 7 is configured such that the rotor 16 is fixed to the driving shaft 3, and the stator 18 is fixed to an inner side portion of the casing 4. The electric motor 7 is configured such that: a magnetic field is generated by supplying current to the armature winding 19 provided at the stator 18; by electromagnetic force generated by changing the magnetic field, a driving force is generated at the magnets 17 arranged around the rotor 16; and the driving shaft 3 is thus rotated integrally with the rotor 16. Wires and the like related to the driving of the electric motor 7 are not shown. Moreover, the electric motor may be an induction motor which does not use magnets.

Further, as shown in FIG. 2, cooling passages 20 are formed around the stator 18. Each of the cooling passages causes the hydraulic motor 2 side of the stator 18 to be communicated with the casing 4 rear side of the stator 18. As shown in FIG. 1, the cooling passage 20 is formed to penetrate the stator 18 in an axial direction, and a plurality of the cooling passages 20 are arranged in the circumferential direction.

Moreover, as shown in FIG. 1, an oil discharge port 21 through which operating fluid 22 of the hydraulic motor 2 is discharged from the casing 4 is provided at a rear portion of the casing 4. The casing 4 is filled with oil 23 that is the same as the operating fluid 22. With this, the operating fluid 22 from the hydraulic motor 2 flows through the cooling passages 20 of the stator 18 to be discharged through the oil discharge port 21 of the casing 4. The operating fluid 22 having been discharged through the cooling passage 20 and the oil discharge port 21 flows through a filter or the like to be reutilized as the oil for driving the hydraulic motor 2. As the operating fluid 22 used for cooling, a part of drain oil or inlet/outlet oil of the hydraulic motor 2 can be utilized.

In accordance with the electric motor integrated hydraulic motor 1, the electric motor 7 and the hydraulic motor 2 are coaxially arranged and stored in one casing 4, so that a connection portion therebetween can be simplified, the entire length of the electric motor integrated hydraulic motor 1 can be reduced to realize size reduction, and the weight thereof can be reduced to realize light weight. In addition, since the operating fluid 22 of the hydraulic motor 2 is used to cool down the electric motor 7, it is unnecessary to additionally provide a configuration of supplying oil for cooling. Therefore, in this regard, the electric motor integrated hydraulic motor 1 can be configured to be reduced in size and weight.

Moreover, the operation of high energy use efficiency can be carried out by causing the electric motor 7 to carry out the electric power regeneration to store the regenerative electric power in the capacitor when, for example, the electric motor integrated hydraulic motor 1 slows down from its steady operation.

Figure 3:
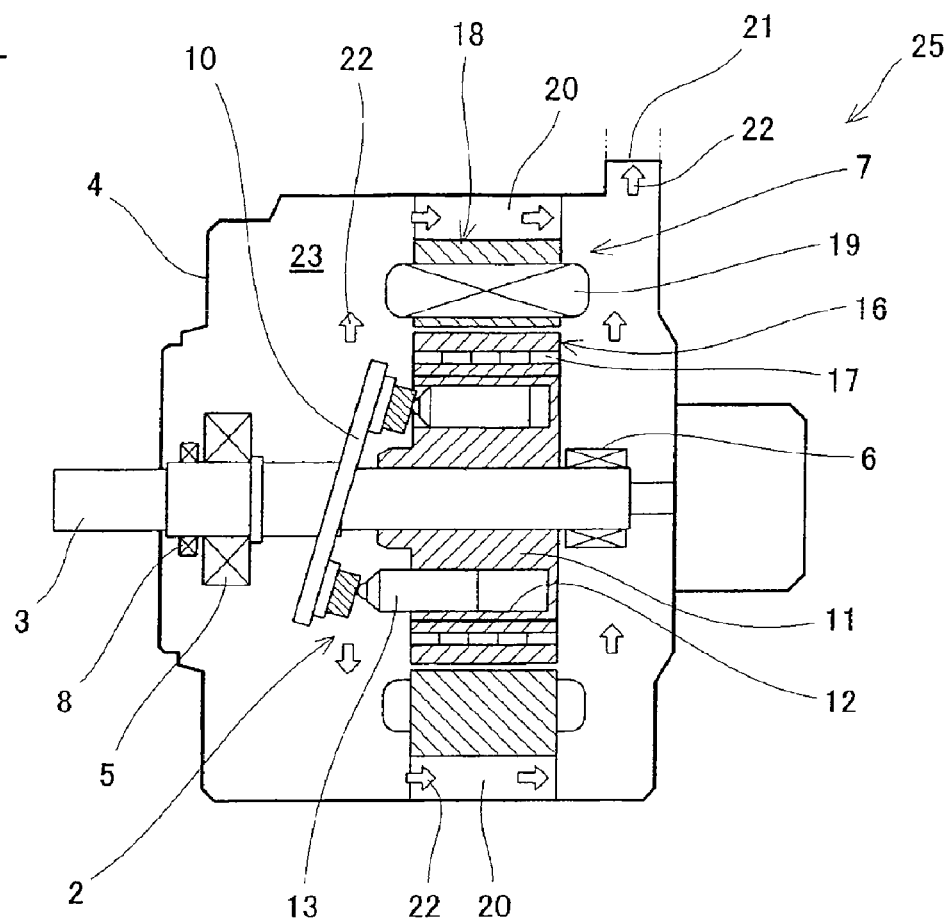
FIG. 3 is a longitudinal sectional view showing the electric motor integrated hydraulic motor according to Embodiment 2 of the present invention.

FIG. 3 is a longitudinal sectional view showing the electric motor integrated hydraulic motor according to Embodiment 2 of the present invention. In the present embodiment, the same reference numbers are used for the same components as in the electric motor integrated hydraulic motor 1 shown in FIGS. 1 and 2.

As shown in the drawing, in an electric motor integrated hydraulic motor 25 according to the present embodiment, the rotor 16 of the electric motor 7 is provided at an outer periphery of the cylinder block 11 of the hydraulic motor 2, and the stator 18 of the electric motor 7 is provided at an outer periphery of the rotor 16. The stator 18 is provided at the inner side portion of the casing 4. A connection structure between the cylinder block 11 of the hydraulic motor 2 and the rotor 16 of the electric motor 7 may be any connection structure as long as the rotor 16 can be rotated integrally with the cylinder block 11.

In the present embodiment, the driving shaft 3 of the hydraulic motor 2 is constituted by a continuous shaft extending from the front end portion of the casing 4 up to the rear end portion thereof, and the driving shaft 3 is rotatably supported by the bearings 5 and 6 respectively provided at the front and rear end portions in the casing 4. The seal member 8 sealing the periphery of the driving shaft 3 is provided on the outside of the bearing 5 in the front portion of the casing 4.

In accordance with the electric motor integrated hydraulic motor 25, the hydraulic motor 2 and the electric motor 7 share the driving shaft 3. Thus, the increase in size in the axial direction can be avoided, and the reduction in weight can be realized. Moreover, in accordance with the electric motor integrated hydraulic motor 25, the operation of high energy use efficiency can be carried out by causing the electric motor 7 to carry out the electric power regeneration to store the regenerative electric power in the capacitor when, for example, the electric motor integrated hydraulic motor 25 slows down from its steady operation.

Figure 4:
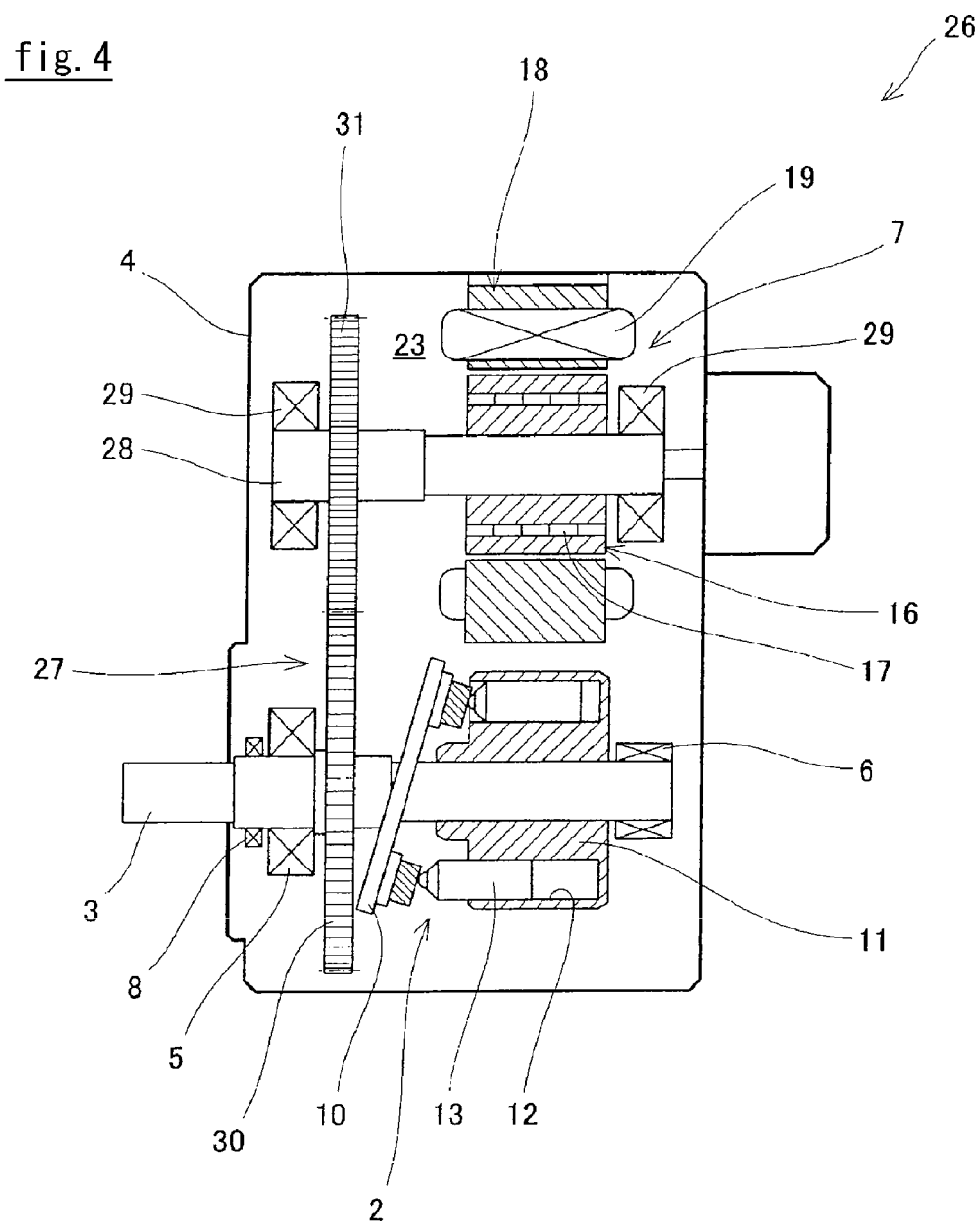
FIG. 4 is a longitudinal sectional view showing the electric motor integrated hydraulic motor according to Embodiment 3 of the present invention.

FIG. 4 is a longitudinal sectional view showing the electric motor integrated hydraulic motor according to Embodiment 3 of the present invention. In the present embodiment, the same reference numbers are used for the same components as in the electric motor integrated hydraulic motor 1 shown in FIGS. 1 and 2.

As shown in the drawing, in an electric motor integrated hydraulic motor 26 according to the present embodiment, the electric motor 7 and the hydraulic motor 2 are arranged in parallel with each other, and the driving shaft 3 can be driven by the hydraulic motor 2 and the driving shaft 3 can also be driven by the electric motor 7 via a reduction mechanism 27.

In the present embodiment, the driving shaft 3 of the hydraulic motor 2 is constituted by a continuous shaft extending from the front end portion of the casing 4 up to the rear end portion thereof, and the driving shaft 3 is rotatably supported by the bearings 5 and 6 respectively provided at the front and rear end portions in the casing 4. The seal member 8 sealing the periphery of the driving shaft 3 is provided on the outside of the bearing 5 in the front portion of the casing 4. Moreover, an electric motor shaft 28 at which the electric motor 7 is provided is rotatably supported by bearings 29 respectively provided at the front and rear end portions in the casing 4.

The reduction mechanism 27 is constituted by a driving shaft gear 30 provided at the driving shaft 3 and an electric motor shaft gear 31 provided at the electric motor shaft 28. Moreover, these gears are configured such that the driving shaft gear 30 rotates while reducing the number of rotations of the electric motor shaft gear 31.

In accordance with the electric motor integrated hydraulic motor 26, the electric motor 7 and the hydraulic motor 2 can be integrally provided in one casing 4, the configuration thereof can be simplified, and the size and weight thereof can be reduced. In addition, in accordance with the present embodiment, rated revolutions of each of the electric motor 7 and the hydraulic motor 2 can be freely set by suitably selecting a reduction ratio of the reduction mechanism 27. Therefore, the electric motor integrated hydraulic motor 26 can be configured such that the combination of the driving of the driving shaft 3 by the hydraulic motor 2 and the driving of the driving shaft 3 by the electric motor 7 is optimally set.

Moreover, in accordance with the electric motor integrated hydraulic motor 26, the operation of high energy use efficiency can be carried out by causing the electric motor 7 to carry out the electric power regeneration to store the regenerative electric power in the capacitor when, for example, the electric motor integrated hydraulic motor 26 slows down from its steady operation.

As above, in accordance with the electric motor integrated hydraulic motors 1, 25, and 26 shown in FIGS. 1 to 4, it is possible to provide a small-size light-weight electric motor integrated hydraulic motor in which: the hydraulic motor 2 and the electric motor 7 are provided in one casing 4 without providing a dividing wall therebetween; and the electric motor 7 is integrally provided with a simple configuration. In addition, the operation of high energy use efficiency can be carried out.

Moreover, as shown in FIGS. 1 and 3, the operating fluid 22 of the hydraulic motor 2 is utilized to cool down the winding wire of the electric motor 7 and the rotor 16 by circulating the operating fluid 22 in the casing 4. Therefore, the heat generated as the loss of the electric motor can be discharged to outside by using the operating fluid 22 as a medium.

Figure 5:
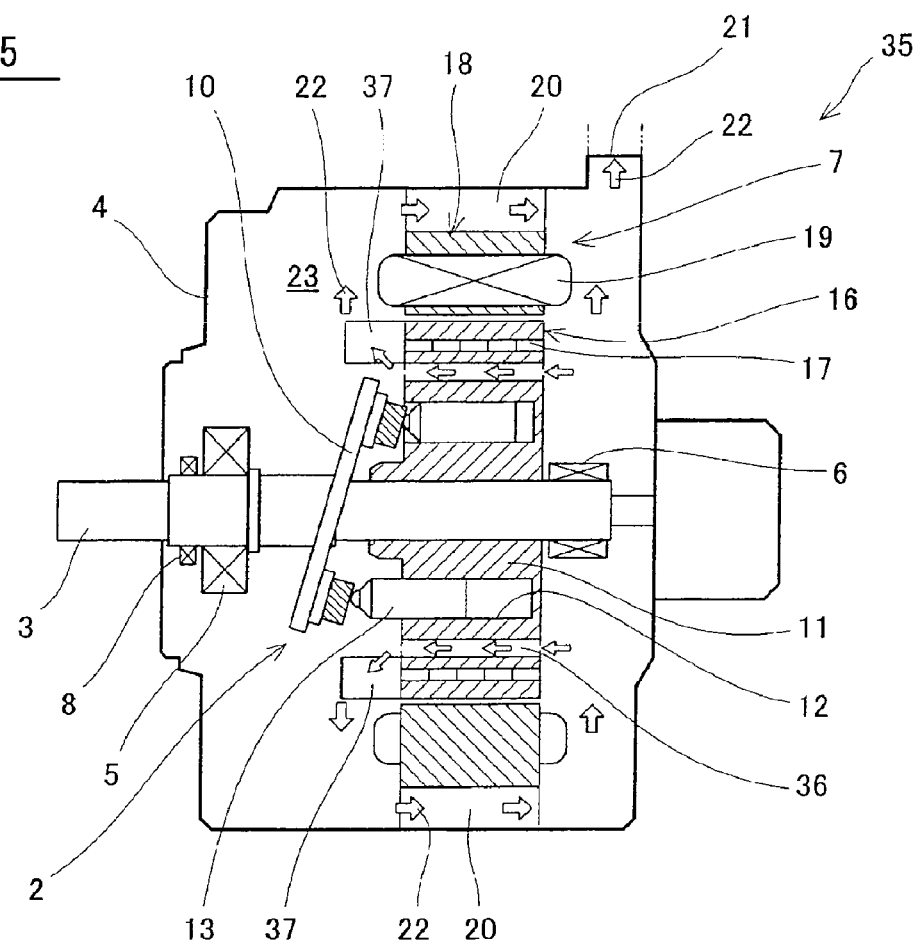
FIG. 5 is a longitudinal sectional view of the electric motor integrated hydraulic motor according to Embodiment 4 of the present invention.

FIG. 5 is a longitudinal sectional view showing the electric motor integrated hydraulic motor according to Embodiment 4 of the present invention. In the present embodiment, the same reference numbers are used for the same components as in the electric motor integrated hydraulic motor 1 shown in FIGS. 1 and 2.

As shown in the drawing, in an electric motor integrated hydraulic motor 35 according to the present embodiment, the rotor 16 of the electric motor 7 is fixed to an outer peripheral portion of the hydraulic motor 2, and the stator 18 is provided at an outer peripheral portion of the rotor 16. The stator 18 is fixed to the inner side portion of the casing 4, and a plurality of cooling passages 20 each penetrating the stator 18 in the axial direction are arranged in the circumferential direction of the stator 18. Moreover, oil passages 36 each penetrating the rotor 16 of the electric motor 7 in the axial direction are provided at the rotor 16. As with the cooling passages 20, a plurality of oil passages 36 are provided in the circumferential direction of the rotor 16.

Here, a wing-shaped fin 37 is provided as a circulating mechanism on one end side (the swash plate 10 side in this example) of the rotor 16. The rotation of the fin 37 causes the oil in the casing 4 to flow outwardly. Since the driving of the driving shaft 3 by the hydraulic motor 2 and the electric motor 7 is the same as that in Embodiment 2, an explanation thereof is omitted.

In accordance with the electric motor integrated hydraulic motor 35, the operating fluid 22 in the casing 4 is caused to strongly flow outwardly by a centrifugal force of the fin 37, and the operating fluid 22 is caused to flow to the armature winding 19 that is a major heat generating portion of the electric motor 7. With this, a further satisfactory cooling effect can be achieved.

In addition, the oil passages 36 through which the operating fluid 22 flows are formed inside the rotor 16 of the electric motor 7. Therefore, by increasing an internally circulating amount of the operating fluid 22, the rotor 16 of the electric motor 7 can be further efficiently cooled down, and the cooling efficiency can be further improved. Moreover, in accordance with the electric motor integrated hydraulic motor 35, the operation of high energy use efficiency can be carried out by causing the electric motor 7 to carry out the electric power regeneration to store the regenerative electric power in the capacitor when, for example, the electric motor integrated hydraulic motor 35 slows down from its steady operation.

Figure 6:
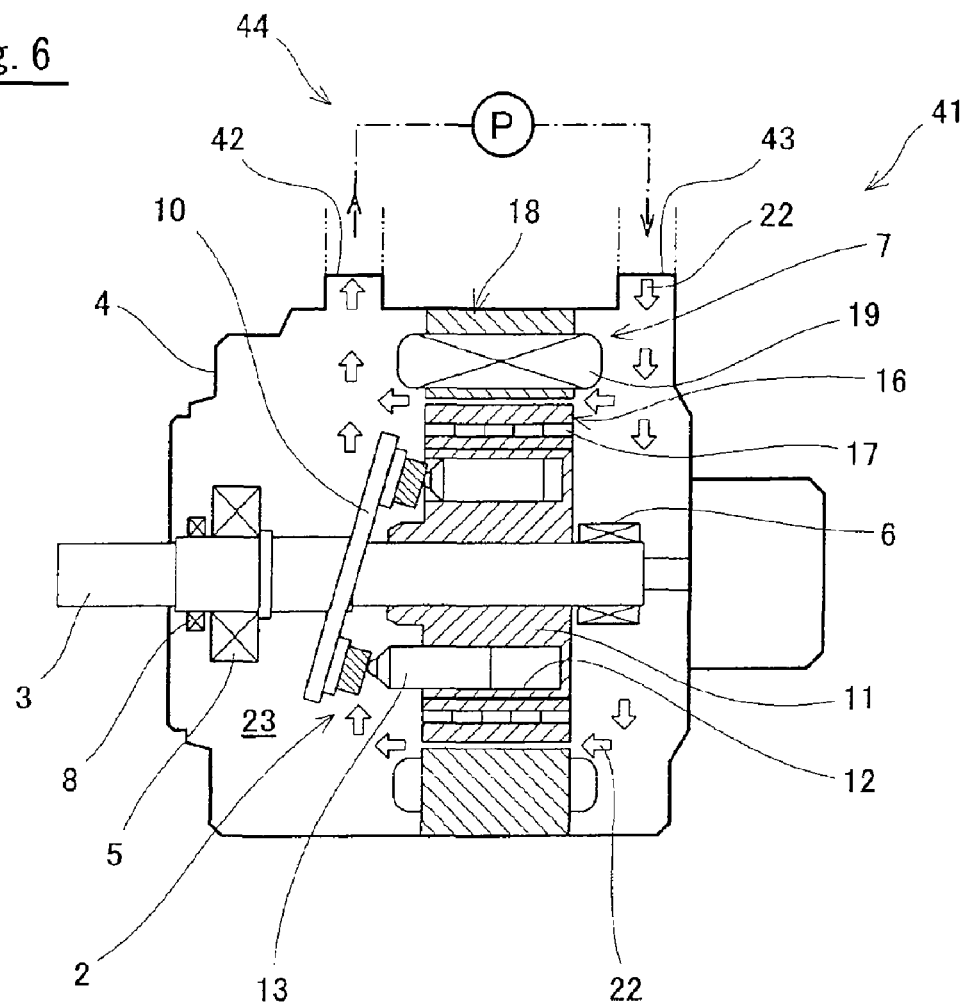
FIG. 6 is a longitudinal sectional view of the electric motor integrated hydraulic motor according to Embodiment 5 of the present invention.

FIG. 6 is a longitudinal sectional view showing the electric motor integrated hydraulic motor according to Embodiment 5 of the present invention. In the present embodiment, the same reference numbers are used for the same components as in the electric motor integrated hydraulic motor 1 shown in FIGS. 1 and 2.

As shown in the drawing, in an electric motor integrated hydraulic motor 41 according to the present embodiment, the rotor 16 of the electric motor 7 is provided at an outer periphery of the cylinder block 11 of the hydraulic motor 2, and the stator 18 of the electric motor 7 is provided at an outer periphery of the rotor 16. In the casing 4 of the present embodiment, an oil discharge port 42 is formed on a front side of the electric motor 7 in the axial direction, and an oil supply port 43 is formed on a rear side of the electric motor 7 in the axial direction. A forced circulation mechanism 44 configured to supply the operating fluid 22 from the oil supply port 43 and recover the operating fluid 22 from the oil discharge port 42 is provided between the oil supply port 43 and the oil discharge port 42. As the forced circulation mechanism 44, for example, a pilot pump P included in this type of hydraulic apparatus is utilized. By supplying the pressure oil from the oil supply port 43 and recovering the pressure oil from the oil discharge port 42 by the pilot pump P, a mechanism of forcibly cooling down the operating fluid 22 can be configured without additionally providing a pump. In the case of adopting such forced cooling system, a dedicated device configured to cool down and circulate the cooling medium is generally required outside the system. However, an operating fluid cooling device is usually provided in the hydraulic apparatus. Therefore, it is unnecessary to additionally provide a cooling device for the electric motor 7. Moreover, in a case where a part of the sucked oil of the hydraulic motor 2 is utilized instead of providing the pilot pump P, it becomes unnecessary to externally provide the forced circulation mechanism 44. Since the driving of the driving shaft 3 by the hydraulic motor 2 and the electric motor 7 is the same as that in Embodiment 2, a detailed explanation thereof is omitted.

In accordance with the electric motor integrated hydraulic motor 41, the operating fluid 22 having comparatively high pressure is poured from the oil supply port 43 of the casing 4 into the casing 4 by the forced circulation mechanism 44, and the operating fluid 22 is forcibly circulated between the rotor 16 and the stator 18 in the casing 4 and is recovered from the oil discharge port 42. With this, the further higher cooling effect can be obtained. Moreover, in accordance with the present embodiment, the cooling efficiency can be further improved by using pilot oil (operating fluid 22) which is lower in temperature than the operating fluid 22 in Embodiments 1 to 4. Further, in the present embodiment, by causing the pressurized pilot oil (operating fluid 22) to flow through a narrow gap between the rotor 16 and the stator 18 of the electric motor 7 at high speed, the retention of foreign matters can be prevented. In addition, by forcibly cooling as above, the electric motor 7 can be further reduced in size and weight. Further, in accordance with the electric motor integrated hydraulic motor 41, the operation of high energy use efficiency can be carried out by causing the electric motor 7 to carry out the electric power regeneration to store the regenerative electric power in the capacitor when, for example, the electric motor integrated hydraulic motor 41 slows down from its steady operation.

Figure 7:
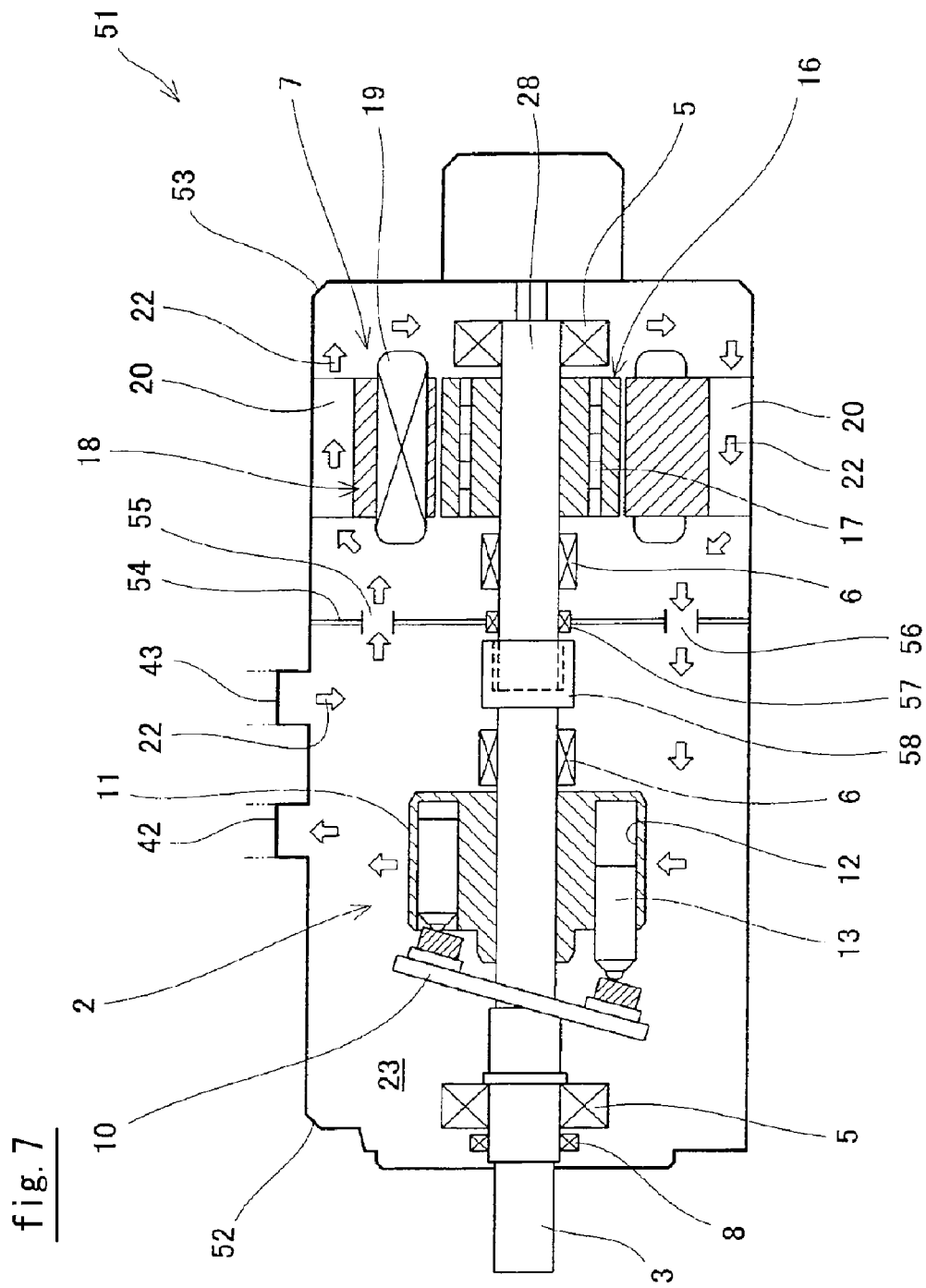
FIG. 7 is a longitudinal sectional view showing the electric motor integrated hydraulic motor of Modification Example.

FIG. 7 is a longitudinal sectional view showing the electric motor integrated hydraulic motor of Modification Example. Modification Example will be explained based on this drawing. The same reference numbers are used for the same components as in the above embodiments. In an electric motor integrated hydraulic motor 51, a casing 52 of the hydraulic motor 2 and a casing 53 of the electric motor 7 are joined to each other by a joint portion 54. The joint portion 54 includes oil passages 55 and 56, so that the inside of the casing 52 of the hydraulic motor 2 and the inside of the casing 53 of the electric motor 7 are communicated with each other. Moreover, the driving shaft 3 of the hydraulic motor 2 and the electric motor shaft 28 of the electric motor 7 are coupled to each other by, for example, a spline 58 to be formed as a continuous shaft. A seal member 57 is provided between the electric motor shaft 28 and the joint portion 54. Further, the casing 52 of the hydraulic motor 2 includes the oil supply port 43 and the oil discharge port 42.

The operating fluid 22 having been supplied through the oil supply port 43 is introduced through the oil passage 55 to the electric motor 7 side, and the operating fluid 22 having flowed through the cooling passage 20 of the electric motor 7 is introduced through the oil passage 56 to the hydraulic motor 2 side to be discharged through the oil discharge port 42. As above, the hydraulic motor 2 and the electric motor 7 may be individually configured, and the operating fluid 22 may be introduced from the hydraulic motor 2 to the electric motor 7.

In accordance with the above-described electric motor integrated hydraulic motors 1, 25, 26, 35, 41, and 51, the hydraulic motor 2 and the electric motor 7 are used at the same time. Therefore, operational feelings can be improved by appropriately controlling these motors so as to be suitable for industrial machinery using the electric motor integrated hydraulic motor 1, 25, 26, 35, 41, or 51, such as shock reduction at the time of operation start and stop, smooth acceleration and deceleration, and prevention of swing-back at the time of operation stop.

In addition, in accordance with the electric motor integrated hydraulic motors 1, 25, 26, 35, 41, and 51 only the driving shaft 3 is exposed to outside. Therefore, the energy saving can be achieved by replacing the hydraulic motor among existing devices mounted on an existing industrial machinery, i.e., by simply altering the existing device without changing the other devices, such as an existing reduction gear.

Moreover, in the case of using the hydraulic motor 2 as a hydraulic pump, it is possible to configure an integrated hydraulic unit whose rotating portion is not exposed to outside as compared to a drive configuration of a conventional engine. Thus, a flexible arrangement of devices can be realized, and it is possible to realize a noiseless hydraulic unit which is small in size and light in weight and has an excellent degree of freedom regarding the installation location.

Further, the above-described embodiments are just examples. Respective components in the embodiments may be suitably combined depending on use conditions, and various modifications may be made within the scope of the present invention. The present invention is not limited to the above embodiments.

INDUSTRIAL APPLICABILITY

The electric motor integrated hydraulic motor according to the present invention is applicable to construction machineries, winches of ships, and the other industrial machineries using hydraulic motors.

The invention claimed is:

1. An electric motor integrated hydraulic motor configured such that a swash plate type hydraulic motor and an electric motor are provided in one casing, wherein:
   the casing is filled with oil;
   a driving shaft of the swash plate type hydraulic motor is configured to extend from a front end portion of the casing up to a rear end portion thereof and be supported at the front and rear end portions in the casing;
   a rotor of the electric motor is provided at an outer peripheral portion of the swash plate type hydraulic motor; and
   a stator of the electric motor is provided at an inner side portion of the casing.

2. The electric motor integrated hydraulic motor according to claim 1, comprising:
   a cooling passage penetrating the stator of the electric motor in an axial direction;
   an oil passage formed between the swash plate type hydraulic motor and the rotor of the electric motor and extending in the axial direction of the driving shaft;
   a circulating mechanism configured to rotate integrally with the rotor of the electric motor; and
   an oil discharge port through which operating fluid having been circulated in the casing by the circulating mechanism is discharged to an outside of the casing.

3. The electric motor integrated hydraulic motor according to claim 1, comprising:
   an oil supply port and an oil discharge port which are formed on the casing and respectively located on a front side and rear side of the electric motor in an axial direction; and
   a forced circulation mechanism configured to forcibly supply oil through the oil supply port, cause the oil to flow between the rotor and the stator of the electric motor, and discharge the oil through the oil discharge port.

4. An electric motor integrated hydraulic motor configured such that a swash plate type hydraulic motor and an electric motor are provided in one casing, wherein:
   the casing is filled with oil;
   a driving shaft of the swash plate type hydraulic motor is configured to extend from a front end portion of the casing up to a rear end portion thereof and be supported at the front and rear end portions in the casing
   an electric motor shaft is provided in parallel with the driving shaft; the swash plate type hydraulic motor is provided at the driving shaft;
   the electric motor is provided at the electric motor shaft; and
   a power transmission mechanism is provided between the electric motor shaft and the driving shaft.

* * * * *

UNITED STATES PATENT AND TRADEMARK OFFICE
CERTIFICATE OF CORRECTION

PATENT NO. : 8,358,042 B2
APPLICATION NO. : 12/918959
DATED : January 22, 2013
INVENTOR(S) : Yamada et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 274 days.

Signed and Sealed this
First Day of September, 2015

Michelle K. Lee
*Director of the United States Patent and Trademark Office*